US012798345B2

(12) United States Patent
Ogawa

(10) Patent No.: US 12,798,345 B2
(45) Date of Patent: Nov. 17, 2026

(54) STRUCTURE FOR ATTACHING AN INNER WEATHERSTRIP

(71) Applicant: TOKAI KOGYO CO., LTD., Obu (JP)

(72) Inventor: Atsushi Ogawa, Obu (JP)

(73) Assignee: TOKAI KOGYO CO., LTD., Obu (JP)

(*) Notice: Subject to any disclaimer, the term of this patent is extended or adjusted under 35 U.S.C. 154(b) by 380 days.

(21) Appl. No.: 18/284,218

(22) PCT Filed: Mar. 22, 2022

(86) PCT No.: PCT/JP2022/013117
§ 371 (c)(1),
(2) Date: Sep. 26, 2023

(87) PCT Pub. No.: WO2022/210085
PCT Pub. Date: Oct. 6, 2022

(65) Prior Publication Data

US 2024/0367494 A1 Nov. 7, 2024

(30) Foreign Application Priority Data

Mar. 31, 2021 (JP) ................................ 2021-060063

(51) Int. Cl.
*B60J 10/75* (2016.01)
*B60J 10/22* (2016.01)
(Continued)

(52) U.S. Cl.
CPC ............... *B60J 10/75* (2016.02); *B60J 10/22* (2016.02); *B60J 10/30* (2016.02); *B60J 10/86* (2016.02)

(58) Field of Classification Search
CPC ... B60J 10/75; B60J 10/30; B60J 10/32; B60J 10/265; B60J 10/235; B60J 10/22; B60J 10/86; B60R 13/0206
(Continued)

(56) References Cited

U.S. PATENT DOCUMENTS 5,561,003 A * 10/1996 Nowosiadly ............. B60J 10/30 49/495.1
6,119,404 A * 9/2000 Bschorr ................... B60J 10/50 49/490.1
(Continued)

FOREIGN PATENT DOCUMENTS

CN 207697470 U 8/2018
JP 2000-177505 A 6/2000
(Continued)

OTHER PUBLICATIONS

Jun. 14, 2022 International Search Report issued in International Patent Application No. PCT/JP2022/013117.
(Continued)

*Primary Examiner* — Justin B Rephann
(74) *Attorney, Agent, or Firm* — Oliff PLC

(57) ABSTRACT

An inner weatherstrip is attached to a flange formed on an upper edge of a door panel. The flange is formed with a protrusion portion protruding toward a vehicle inside by cutting and raising a part of the flange to protrude toward a vehicle inside and having a contact surface. On the other hand, a vehicle inside sidewall portion of the inner weatherstrip is formed with a positioning surface by recessing a part facing the protrusion portion toward the vehicle inside. When the inner weatherstrip is attached to the flange, the positioning surface is in contact with the contact surface.

7 Claims, 7 Drawing Sheets

(51) Int. Cl.
*B60J 10/30* (2016.01)
*B60J 10/86* (2016.01)

(58) Field of Classification Search
USPC .............................................. 49/489.1, 490.1
See application file for complete search history.

(56) References Cited

U.S. PATENT DOCUMENTS

| | | | | | |
|---|---|---|---|---|---|
| 6,260,254 | B1 * | 7/2001 | Mueller | B60J 10/265 29/453 |
| 6,966,601 | B2 * | 11/2005 | Matsumoto | B60R 13/0237 49/490.1 |
| 8,714,624 | B2 * | 5/2014 | Fukui | B60J 10/235 296/146.1 |
| 9,027,982 | B2 * | 5/2015 | Ide | B60J 10/75 49/502 |
| 10,286,768 | B2 * | 5/2019 | Ogawa | B60J 10/75 |
| 10,889,171 | B2 * | 1/2021 | Thiele | B60J 10/32 |
| 10,946,735 | B2 * | 3/2021 | Robinson | B60J 10/75 |
| 2004/0094989 | A1 * | 5/2004 | Matsumoto | B60J 10/32 296/146.1 |
| 2017/0232827 | A1 * | 8/2017 | Ogawa | B60J 10/75 49/495.1 |

FOREIGN PATENT DOCUMENTS

| | | | |
|---|---|---|---|
| JP | 2000-326734 | A | 11/2000 |
| JP | 2004-074830 | A | 3/2004 |
| JP | 2005-254915 | A | 9/2005 |
| JP | 2014-184765 | A | 10/2014 |
| JP | 2017-144990 | A | 8/2017 |
| JP | 2019-214332 | A | 12/2019 |

OTHER PUBLICATIONS

Jun. 14, 2022 Written Opinion of the International Searching Authority issued in International Patent Application No. PCT/JP2022/013117.

Jul. 24, 2026 Office Action issued in Chinese Patent Application No. 202280026115.0.

* cited by examiner

STRUCTURE FOR ATTACHING AN INNER WEATHERSTRIP

TECHNICAL FIELD

The present disclosure relates to a structure for attaching an inner weatherstrip and an inner weatherstrip used therein.

BACKGROUND ART

Automobile doors have an elongated inner weatherstrip attached along the upper edge of a door panel. As this type of technology, there is, for example, Patent Literature 1 below. In Patent Literature 1, a glass inner weatherstrip 5A is attached to the upper edge of a door inner panel 2A. The rear terminal of the glass inner weatherstrip 5A faces a die molding connection portion $4B_1$ of a glass run 4 with a gap therebetween (paragraph [0014]).

CITATION LIST

Patent Literature

Patent Literature 1: JP2000-326734A

SUMMARY OF INVENTION

Technical Problem

In Patent Literature 1, the glass inner weatherstrip 5A is inserted and attached from above the door inner panel 2A. At this time, the glass inner weatherstrip 5A and the door inner panel 2A are not provided with a positioning structure for determining the attachment position of the glass inner weatherstrip 5A. Therefore, the attachment position of the glass inner weatherstrip 5A has to be finely adjusted according to the operator's sense. This complicates the positioning operation of the glass inner weatherstrip 5A. In addition, there is a possibility that the attachment position of the glass inner weatherstrip 5A differs for each product (vehicle). In particular, the gap between the glass inner weatherstrip 5A and the die molding connection portion $4B_1$ of the glass run 4 tends to vary.

Therefore, a structure for attaching an inner weatherstrip capable of easily positioning the door front-rear direction position of the inner weatherstrip when the inner weatherstrip is attached to the door panel, and an inner weatherstrip for that purpose are provided.

Solution to Problem

The present disclosure employs the following means.

(1) A structure for attaching an elongated inner weatherstrip, in which the inner weatherstrip is attached along an upper edge of a door panel of an automobile door, a flange is formed on the upper edge of the door panel, the inner weatherstrip has a vehicle inside sidewall portion, a vehicle outside sidewall portion, and a top wall portion coupling upper edges of the vehicle inside sidewall portion and the vehicle outside sidewall portion, the flange is inserted between the vehicle inside sidewall portion and the vehicle outside sidewall portion, a protrusion portion protruding toward a vehicle inside is formed at a part of the flange, the protrusion portion has a contact surface facing a center side in a longitudinal direction of the flange, a positioning surface extending in a direction intersecting with a longitudinal direction of the inner weatherstrip is provided at a part of the vehicle inside sidewall portion, the positioning surface is formed by recessing at least a part of the vehicle inside sidewall portion facing the protrusion portion toward the vehicle inside, and the contact surface is in contact with the positioning surface.

(2) A structure for attaching an elongated inner weatherstrip, in which the inner weatherstrip is attached along an upper edge of a door panel of an automobile door, a flange is formed on the upper edge of the door panel, the inner weatherstrip has a vehicle inside sidewall portion, a vehicle outside sidewall portion, and a top wall portion coupling upper edges of the vehicle inside sidewall portion and the vehicle outside sidewall portion, the flange is inserted between the vehicle inside sidewall portion and the vehicle outside sidewall portion, a protrusion portion protruding toward a vehicle outside is formed at a part of the flange, the protrusion portion has a contact surface facing a center side in a longitudinal direction of the flange, a positioning surface extending in a direction intersecting with a longitudinal direction of the inner weatherstrip is provided at a part of the vehicle outside sidewall portion, the positioning surface is formed by recessing at least a part of the vehicle outside sidewall portion facing the protrusion portion toward the vehicle outside, and the contact surface is in contact with the positioning surface.

(3) The structure for attaching an inner weatherstrip according to (1) or (2), in which the protrusion portion is formed by cutting and raising a part of the flange.

(4) The structure for attaching an inner weatherstrip according to (3), in which the protrusion portion is formed by cutting and raising a part of the inner door panel that constitutes the flange.

(5) An elongated inner weatherstrip, in which the inner weatherstrip is attached along an upper edge of a door panel of an automobile door, a vehicle inside sidewall portion, a vehicle outside sidewall portion, and a top wall portion coupling upper edges of the vehicle inside sidewall portion and the vehicle outside sidewall portion are provided, the flange formed on the upper edge of the door panel is attached in a state of being inserted between the vehicle inside sidewall portion and the vehicle outside sidewall portion, a protrusion portion protruding toward a vehicle inside and having a contact surface facing toward a center side in a longitudinal direction of the flange is formed at a part of the flange, a positioning surface extending in a direction intersecting with a longitudinal direction of the inner weatherstrip is provided at a part of the vehicle inside sidewall portion, the positioning surface is formed by recessing at least a part of the vehicle inside sidewall portion facing the protrusion portion toward the vehicle inside, and the contact surface is in contact with the positioning surface in a state of being attached to the door panel.

(6) An elongated inner weatherstrip, in which the inner weatherstrip is attached along an upper edge of a door panel of an automobile door, a vehicle inside sidewall portion, a vehicle outside sidewall portion, and a top wall portion coupling upper edges of the vehicle inside sidewall portion and the vehicle outside sidewall portion are provided, the flange formed on the upper edge of the door panel is attached in a state of being inserted between the vehicle inside sidewall portion and the vehicle outside sidewall portion, a protrusion portion protruding toward a vehicle outside and having a contact surface facing toward a center side in a longitudinal direction of the flange is formed at a part of the flange, a positioning surface extending in a direction intersecting with a longitudinal direction of the inner weatherstrip is provided at a part of the vehicle outside sidewall portion, the positioning surface is formed by recessing at least a part of the vehicle outside sidewall portion facing the protrusion portion toward the vehicle outside, and the contact surface is in contact with the positioning surface in a state of being attached to the door panel.

(7) The inner weatherstrip according to (5) or (6), in which the positioning surface is larger than the contact surface.

(8) The inner weatherstrip according to (5), in which at least one end portion in the longitudinal direction has an injection molded portion formed by injection molding, and the other part is an extrusion molded portion formed by extrusion molding.

(9) The inner weatherstrip according to (8), in which, in the vehicle inside sidewall portion, the injection molded portion overlaps a vehicle inside outer surface of one end portion of the extrusion molded portion in the longitudinal direction, and one end surface of the extrusion molded portion in the longitudinal direction serves as the positioning surface.

(10) The inner weatherstrip according to (8), in which, in the vehicle inside sidewall portion, the injection molded portion overlaps the vehicle inside outer surface of one end portion of the extrusion molded portion in the longitudinal direction, a projected piece protrudes from the injection molded portion toward the vehicle outside to cover one end surface of the extrusion molded portion in the longitudinal direction, and one end surface of the projected piece in the longitudinal direction serves as the positioning surface.

(11) The inner weatherstrip according to (6), in which at least one end portion in the longitudinal direction has an injection molded portion formed by injection molding, and the other part is an extrusion molded portion formed by extrusion molding.

In addition, regarding the "door panel" and "flange" in the present disclosure, when the part to which the inner weatherstrip is attached consists only of the inner door panel, the inner door panel and the upper edge flange thereof correspond to the "door panel" and "flange" as they are. However, when the inner door panel is reinforced by stacking reinforcing plates (for example, reinforcement), the concept of "door panel" and "flange" includes the inner door panel, the reinforcing plate, and the flanges on the upper edges thereof.

In addition, in the present disclosure, "recessing" the vehicle inside sidewall portion or the vehicle outside sidewall portion means "providing a recessed part that is not flush" at a part of the vehicle inside sidewall portion or the vehicle outside sidewall portion. The concept includes not only the formation of recess portions or thin portions but also the formation of through-holes.

Advantageous Effects of Invention

In the present disclosure, a protrusion portion is formed at a part of the flange and a positioning surface is formed on the inner weatherstrip. With this feature, the door front-rear direction position of the inner weatherstrip can be easily positioned simply by attaching the inner weatherstrip to the door panel in a state where the positioning surface is in contact with the contact surface of the protrusion portion.

When only a part of the flange is cut and raised, the protrusion portion can be easily formed, and the positioning structure will not become complicated. Furthermore, a part of the inner door panel may be cut and raised to form the protrusion portion.

By making the positioning surface larger than the contact surface, the positioning surface can be easily brought into contact with the contact surface.

Since the inner weatherstrip is elongated, the inner weatherstrip is basically molded by extrusion molding. However, when at least one end portion in the longitudinal direction is formed as an injection molded portion, the shape can be made to accurately correspond to the structure around the one end portion in the longitudinal direction.

When one end surface of the extrusion molded portion in the longitudinal direction is used as a positioning surface, the deterioration of appearance can be avoided by overlapping the injection molded portion on the vehicle inside outer surface of one end portion of the extrusion molded portion in the longitudinal direction. This is because the injection molded portion can cover the part where the protrusion portion is in contact with the positioning surface.

By forming a projected piece from the injection molded portion to cover one end surface of the extrusion molded portion in the longitudinal direction and using the one end surface of the projected piece in the longitudinal direction as a positioning surface, it is possible to avoid the formation position of the positioning surface being different for each product. The reason is as follows. The extrusion molded portion may vary in length. Therefore, the door front-rear direction position of one end surface of the extrusion molded portion in the longitudinal direction may vary depending on the product. However, since the projected piece is formed by injection molding, even when the position of one end surface of the extrusion molded portion in the longitudinal direction varies, the positioning surface can be formed at a predetermined position.

DESCRIPTION OF EMBODIMENTS

Embodiment 1

Figure 1:
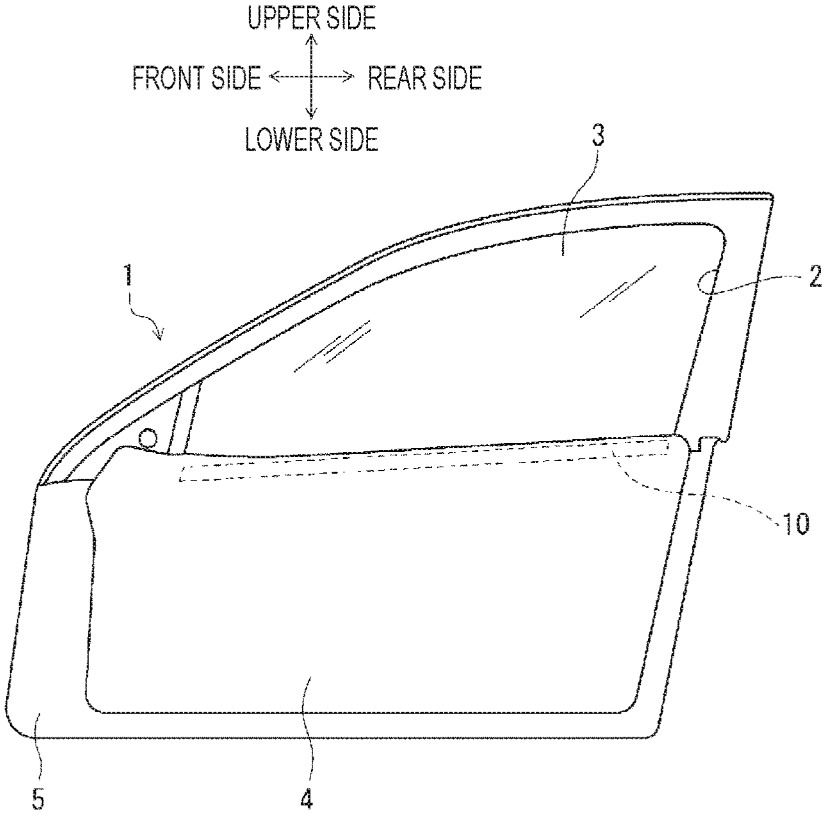
FIG. 1 is a side view of a vehicle inside of an automobile front door.
Figure 2:
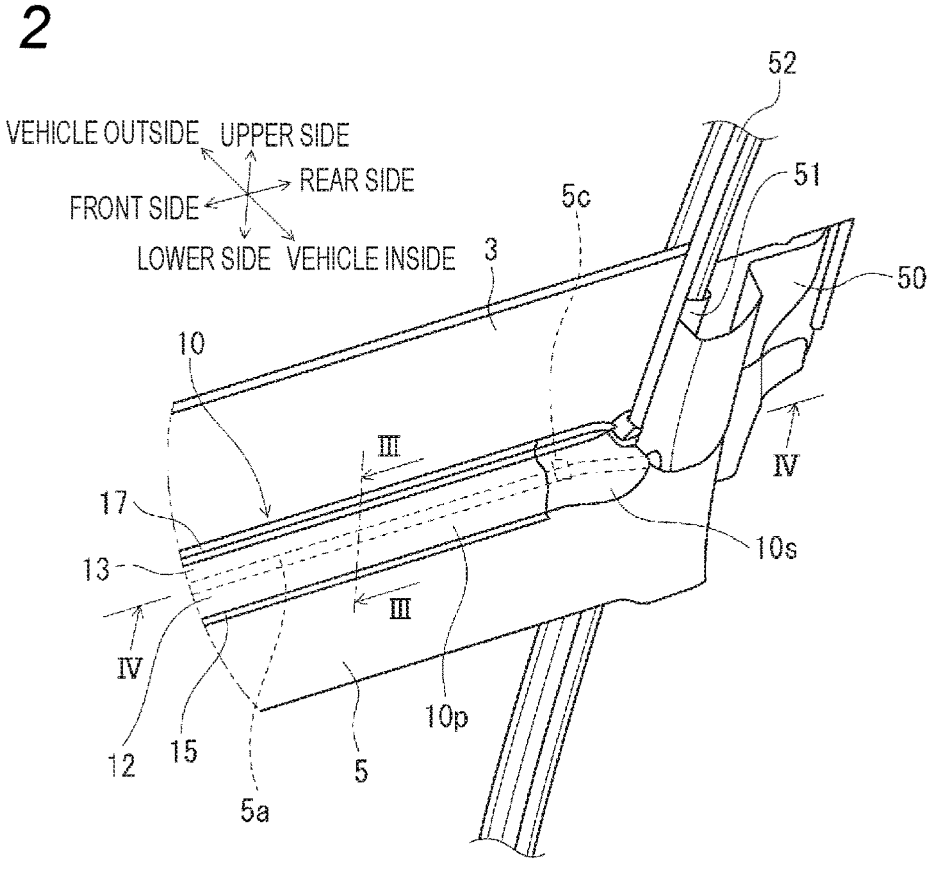
FIG. 2 is a perspective view of the periphery on the rear end side of an inner weatherstrip.
Figure 3:
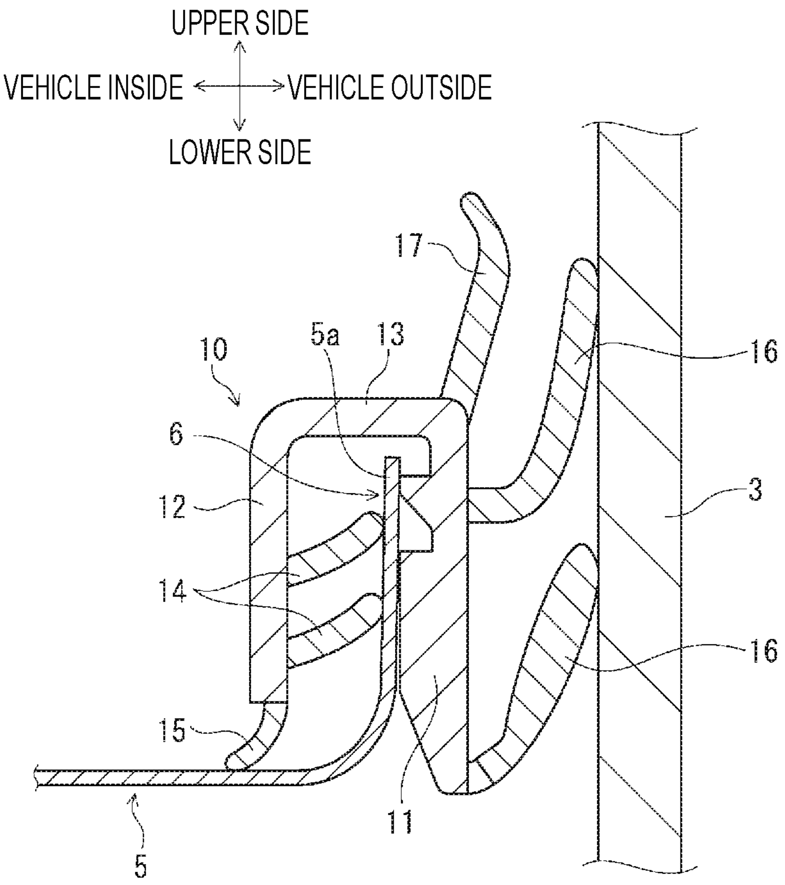
FIG. 3 is a sectional view taken along line III-III in FIG. 2.

FIGS. 1 to 5 show Embodiment 1 of the present disclosure. As shown in FIGS. 1 to 3, an inner weatherstrip 10 is elongated. The inner weatherstrip 10 is located at the lower edge of a window opening 2 of a door 1 of an automobile. The inner weatherstrip 10 elastically comes into contact with a window pane 3 that moves up and down inside the window opening 2. As a result, the inner weatherstrip 10 seals the space between the door panel 5 and the window pane 3 that constitute the door 1. A flange 6 is erected on the upper edge of the door panel 5 by bending an inner door panel 5*a*. The inner weatherstrip 10 is attached to cover the flange 6 from above.

Figure 4:
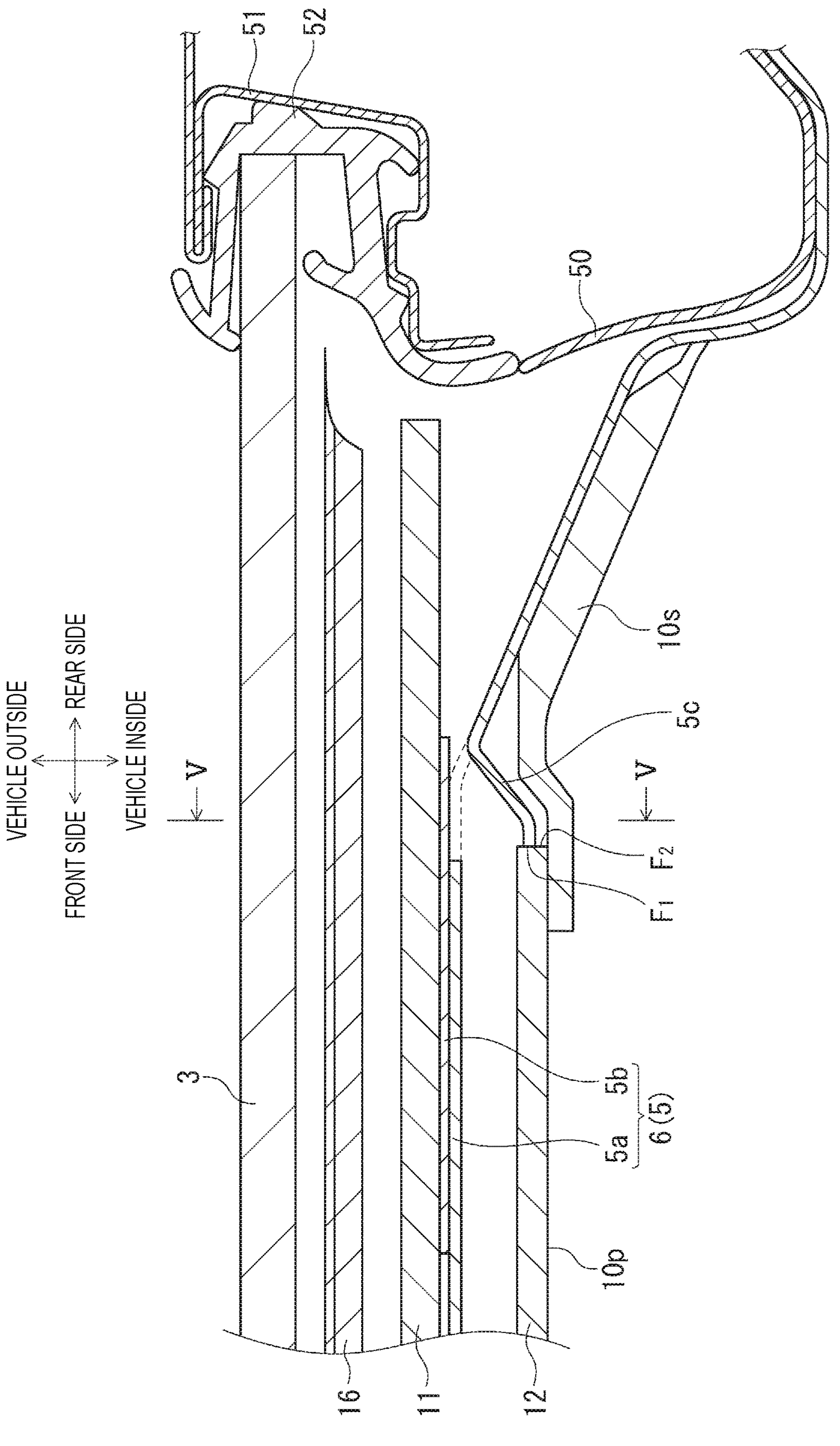
FIG. 4 is a sectional view taken along line IV-IV in FIG. 2.

FIG. 1 shows an example in which the inner weatherstrip 10 is attached to the front door. The inner weatherstrip 10 can also be attached to the rear door. As a weatherstrip, there is an outer weatherstrip that is located on the vehicle outside of the window pane 3, but the present disclosure relates to the inner weatherstrip 10 located on the vehicle inside. FIGS. 1 and 2 are views of the door 1 viewed from the vehicle inside. FIG. 2 is a perspective view of a state where an inside trim 4 covering the door panel 5 is removed. In FIGS. 2 and 4, reference numeral 50 denotes a sash panel. Reference numeral 51 denotes a run channel holder that extends in the up-down direction along the side surface of the window pane 3. Reference numeral 52 denotes a glass run channel which elastically comes into contact with the side edge of the window pane 3. The glass run channel 52 is attached to the run channel holder 51.

The inner weatherstrip 10 is basically an extrusion molded article that has a uniform shape along the entire longitudinal direction thereof. The inner weatherstrip 10 has an approximately inverted U-shaped cross section including a vehicle outside sidewall portion 11, a vehicle inside sidewall portion 12, and a top wall portion 13 coupling the upper edges of both of the sidewall portions 11 and 12 to each other. A holding lip 14 is formed continuously along the longitudinal direction on the inner surface of the vehicle inside sidewall portion 12. A shielding lip 15 is formed continuously along the longitudinal direction on the lower surface of the vehicle inside sidewall portion 12. A seal lip 16 is formed continuously along the longitudinal direction on the outer surface of the vehicle outside sidewall portion 11. A decorative lip 17 is formed continuously along the longitudinal direction at a corner portion between the vehicle outside sidewall portion 11 and the top wall portion 13. In Embodiment 1, two holding lips 14 and two seal lips 16 are formed upper and lower. The holding lip 14 and seal lip 16 may be one or three or more. No lip is formed on the inner surface of the vehicle outside sidewall portion 11. The vehicle outside sidewall portion 11 directly comes into contact with the flange 6 (inner door panel 5*a*).

In the inner weatherstrip 10, an extrusion molded portion 10*p*, which will be described later, is made of a material that can be extruded. The vehicle outside sidewall portion 11, the vehicle inside sidewall portion 12, and the top wall portion 13 are made of a material having higher rigidity than each lip. The holding lip 14, the shielding lip 15, the seal lip 16, and the decorative lip 17 are made of a softer material than the vehicle outside sidewall portion 11 and the like.

Thermoplastic elastomer, thermoplastic resin, rubber, or the like can be used for the material of the vehicle outside sidewall portion 11, the vehicle inside sidewall portion 12, and the top wall portion 13. Specific examples include thermoplastic olefin elastomers (TPO), styrene elastomers (TPS), vinyl chloride resins (PVC), polypropylene resins (PP), and ethylene-propylene-diene copolymers (EPDM). Among them, those having a durometer hardness (type D) of HDA 50 to 80 according to JIS K 7215 are preferable.

As materials for the holding lip 14, the shielding lip 15, the seal lip 16, and the decorative lip 17, thermoplastic elastomer, thermoplastic resin, rubber, and the like, which are softer and more elastically deformable than the vehicle outside sidewall portion 11 and the like, can be used. Specific examples include thermoplastic olefin elastomers (TPO), styrene elastomers (TPS), vinyl chloride resins (PVC), polypropylene resins (PP), and ethylene-propylene-diene copolymers (EPDM). Among them, those having a durometer hardness (type A) of HDA 50 to 90 according to JIS K 7215 are preferable.

The inner weatherstrip 10 is attached in a state where the flange 6 of the door panel 5 is inserted between the vehicle outside sidewall portion 11 and the vehicle inside sidewall portion 12. As a result, the inner weatherstrip 10 is located along the upper edge of the door panel 5. In a state where the inner weatherstrip 10 is attached to the door panel 5, the holding lip 14 is in elastic contact with the flange 6 and clamps the flange 6 together with the vehicle outside sidewall portion 11. The shielding lip 15 is in elastic contact with the door panel 5, and the seal lip 16 is in elastic contact with the window panel 3. The decorative lip 17 hides the gap between the inner weatherstrip 10 and the window pane 3.

Figure 5:
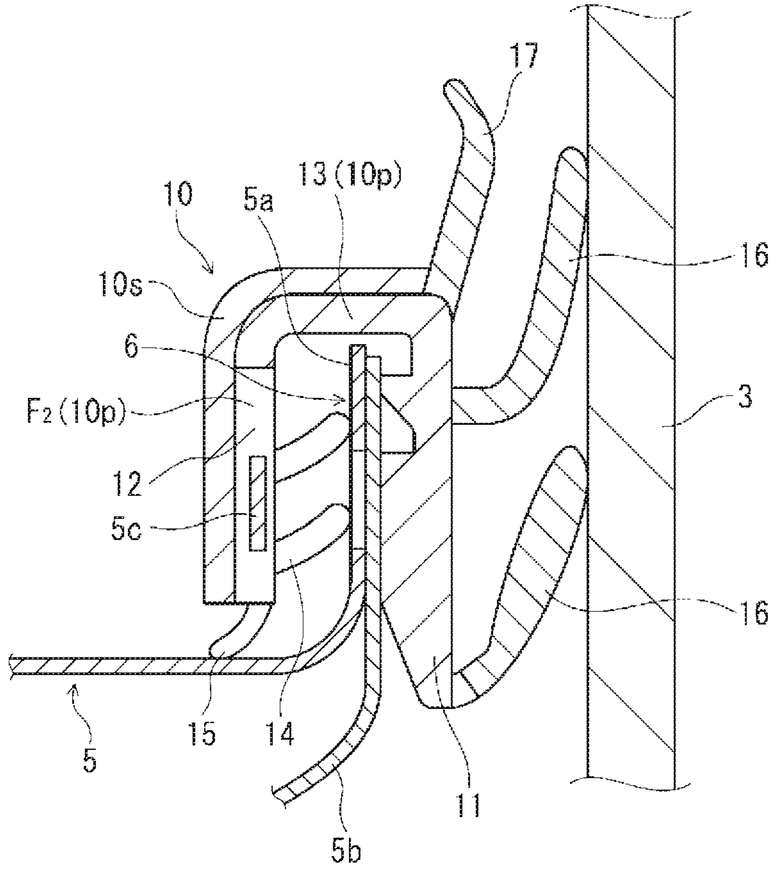
FIG. 5 is a sectional view taken along line V-V in FIG. 4.

As shown in FIGS. 4 and 5, a part of the flange 6 is formed with a protrusion portion 5*c*. The protrusion portion 5*c* is formed by making a slit at a part of the inner door panel 5*a* in the longitudinal direction and cutting and raising the part of the inner door panel 5*a* toward the vehicle inside. The longitudinal direction of the inner door panel 5*a* and the flange 6 is the same as the door front-rear direction. The protrusion portion 5*c* is provided at a part facing the rear end portion of the inner weatherstrip 10. The protrusion portion 5*c* faces toward the center side in the door front-rear direction. Thereby, the protrusion portion 5*c* has a contact surface $F_1$. The contact surface F faces toward the center side in the door front-rear direction, and the surface direction thereof intersects the door front-rear direction.

In Embodiment 1, the inner door panel 5*a* is partially reinforced by overlapping a reinforcement 5*b*. At the rear end portion of the inner weatherstrip 10, the door panel 5 is composed of the inner door panel 5*a* and the reinforcement 5*b*.

The inner weatherstrip 10 is obtained by cutting an extrusion molded article into predetermined lengths. However, as shown in FIGS. 2 and 4, at the rear end portion of the inner weatherstrip 10, the vehicle inside sidewall portion 12 and the holding lip 14 and the shielding lip 15 extending therefrom are cut off by a predetermined size. This cut region is covered with an injection molded portion 10*s* formed by injection molding. In Embodiment 1, the inner weatherstrip 10 has an injection molded portion 10*s* at the rear end portion thereof, and the other part is an extrusion molded portion 10*p* formed by extrusion molding. As a result, the rear end portion shape of the inner weatherstrip 10 can be formed into a shape adapted to the surrounding structure. In Embodiment 1, the rear end portion of the inner weatherstrip 10 corresponds to the "one end portion in the longitudinal direction" of the present disclosure. The vehicle inside sidewall portion 12 and the like are cut such that the rear end of the extrusion molded portion 10*p* is aligned with the door front-rear direction position of the contact surface $F_1$ when the inner weatherstrip 10 is attached to the flange 6.

The injection molded portion 10*s* is made of a thermoplastic elastomer such as an olefinic thermoplastic elastomer, and preferably has a durometer hardness (type A) of HDD 50 to 80 according to JIS K 7215. The injection molded portion 10*s* is integrated with the extrusion molded portion 10*p* by previously setting a part (rear end portion) of the extrusion molded portion 10*p* in the cavity of the injection molding die and performing insert molding. As shown in FIGS. 4 and 5, the front end portion of the injection molded portion 10*s* overlaps the outer surface of the rear end portion of the extrusion molded portion 10*p*. Specifically, the front end portion of the injection molded portion 10*s* overlaps the outer surfaces of the vehicle inside sidewall portion 12 and the top wall portion 13 of the extrusion molded portion 10*p*.

In the vehicle inside sidewall portion 12, the front side of the injection molded portion 10*s* comes into contact with the vehicle inside outer surface of the extrusion molded portion 10*p*, and extends parallel to the extrusion molded portion 10*p* from the contact part toward the rearward of the rear end surface (positioning surface $F_2$) of the extrusion molded portion 10*p*. At a position separated by a predetermined distance rearward from a rear end surface $F_2$ of the extrusion molded portion 10*p*, the injection molded portion 10*s* is located on the vehicle outside and extends parallel to the extrusion molded portion 10*p*. Further rearward, the injection molded portion 10*s* is formed in an inclined shape along the door panel 5. In the vehicle inside sidewall portion 12, a step is formed between the vehicle outside side surface of the extrusion molded portion 10*p* and the vehicle outside side surface of the injection molded portion 10*s*. As a result, in the vehicle inside sidewall portion 12, a part facing the protrusion portion 5*c* is recessed toward the vehicle inside, and a positioning surface $F_2$ extending in a direction intersecting with the longitudinal direction of the inner weatherstrip 10 is formed. The size of the positioning surface $F_2$ is larger than the contact surface $F_1$ of the protrusion portion 5*c*.

When the inner weatherstrip 10 is attached to the flange 6, the flange 6 is inserted between the vehicle outside sidewall portion 11 and the vehicle inside sidewall portion 12 to cover the flange 6 with the inner weatherstrip 10 from above. At this time, by sliding the inner weatherstrip 10 rearward, the positioning surface $F_2$ of the inner weatherstrip 10 comes into contact with the contact surface $F_1$ of the flange 6 (inner door panel 5*a*). Accordingly, it is possible to easily position the door front-rear direction position of the inner weatherstrip 10.

Embodiment 2

Figure 6:
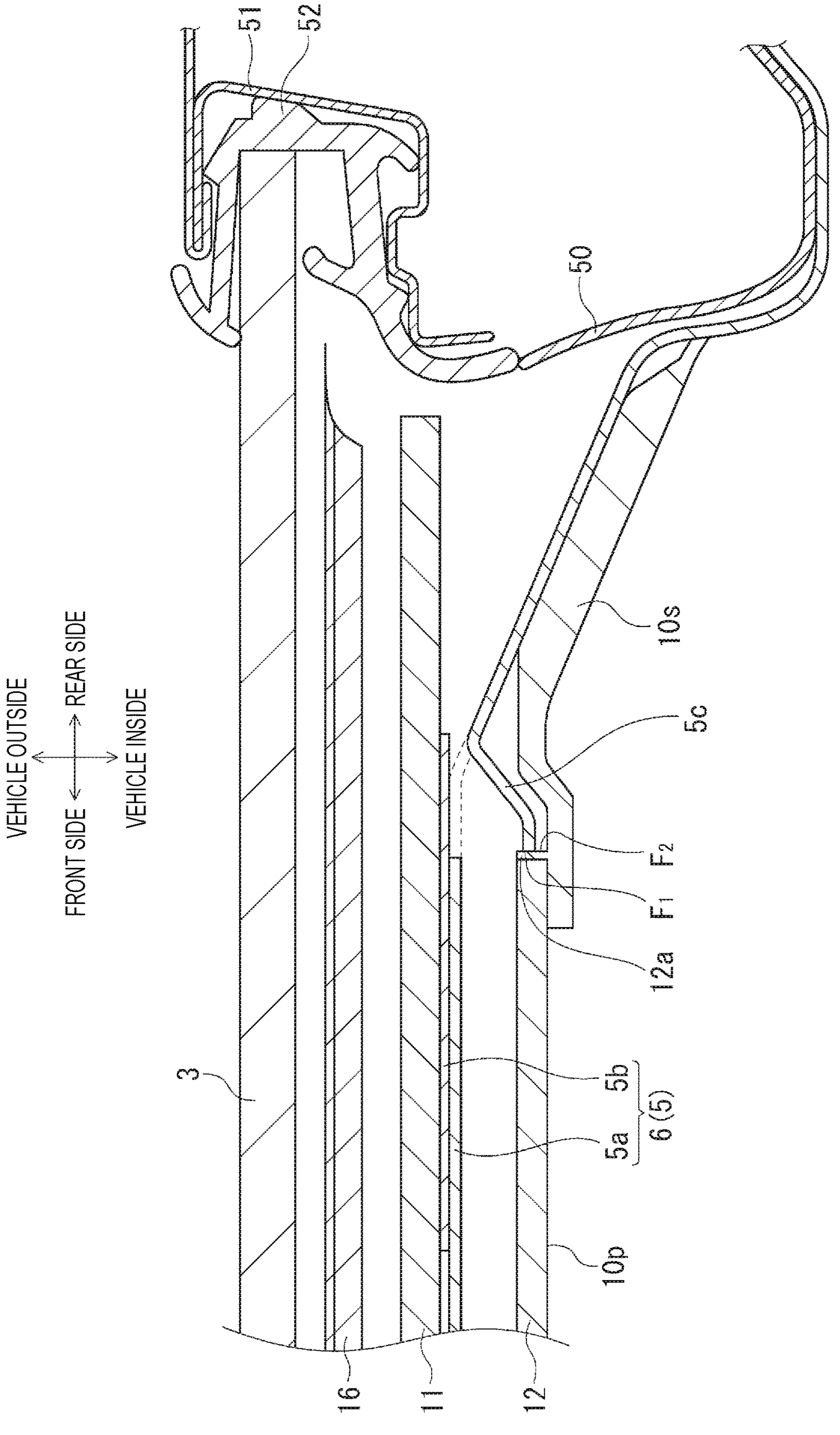
FIG. 6 is a sectional view taken along line IV-IV of FIG. 2 in a second embodiment.

FIG. 6 shows Embodiment 2 of the present disclosure. The basic configuration of Embodiment 2 is the same as that of Embodiment 1, and the protrusion portion 5*c* of the flange 6 (inner door panel 5*a*) protrudes toward the vehicle inside. Further, in the vehicle inside sidewall portion 12, the injection molded portion 10*s* overlaps the vehicle inside outer surface of the rear end portion of the extrusion molded portion 10*p*.

A different point from Embodiment 1 is that a projected piece 12*a* protrudes toward the vehicle outside from the injection molded portion 10*s* to cover the rear end surface of the extrusion molded portion 10*p*. The rear end surface of the projected piece 12*a* is used as the positioning surface $F_2$. The positioning surface $F_2$ is also larger than the contact surface $F_1$ of the protrusion portion 5*c*. In FIG. 6, the areas of the positioning surface $F_2$ and the rear end surface of the extrusion molded portion 10*p* are the same. The projected piece 12*a* may be formed such that the positioning surface $F_2$ is larger than the rear end surface of the extrusion molded portion 10*p*. Since other parts are the same as those of Embodiment 1, the same members will be given the same reference numerals, and the description thereof will be omitted.

Embodiment 3

Figure 7:
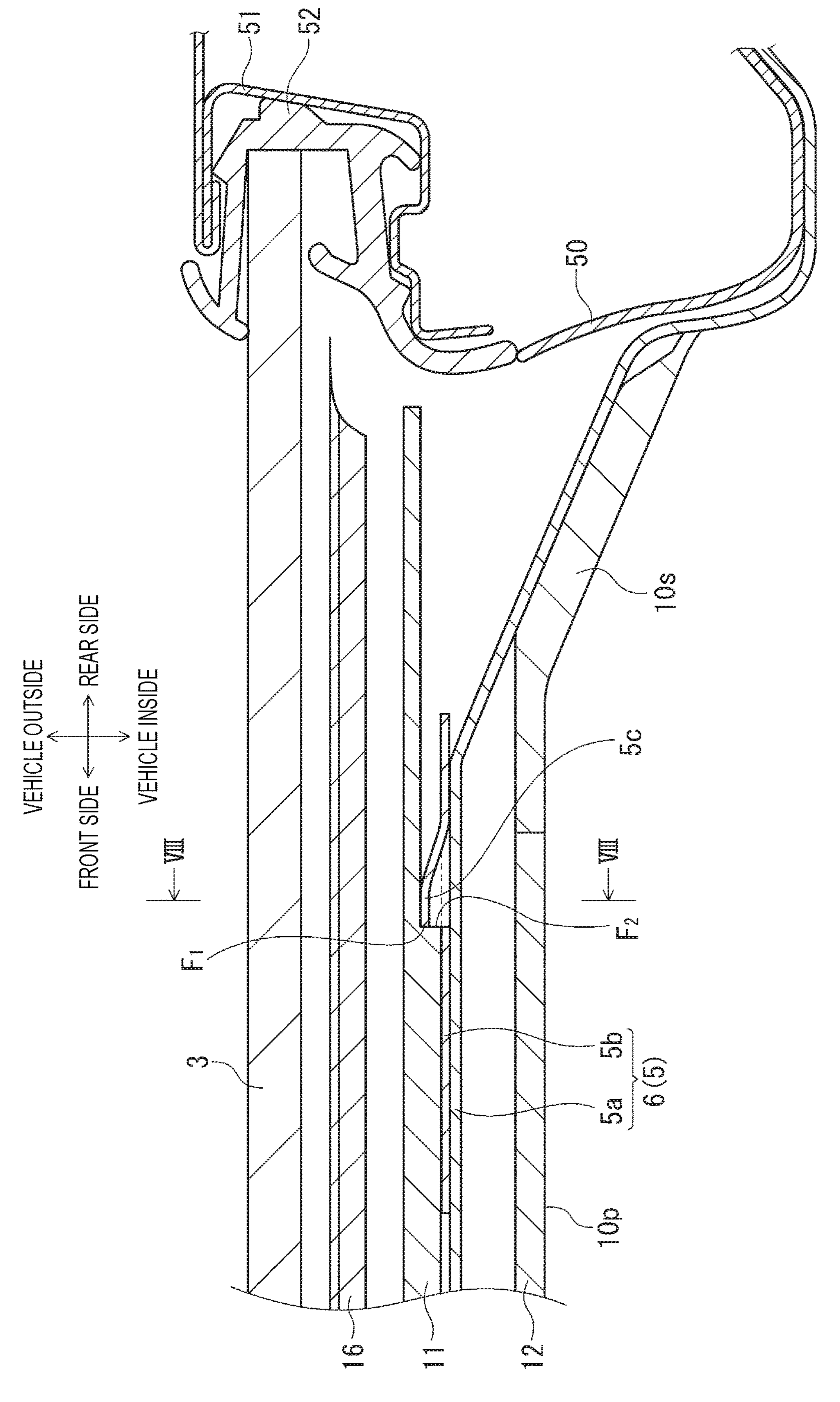
FIG. 7 is a sectional view taken along line IV-IV of FIG. 2 in a third embodiment.
Figure 8:
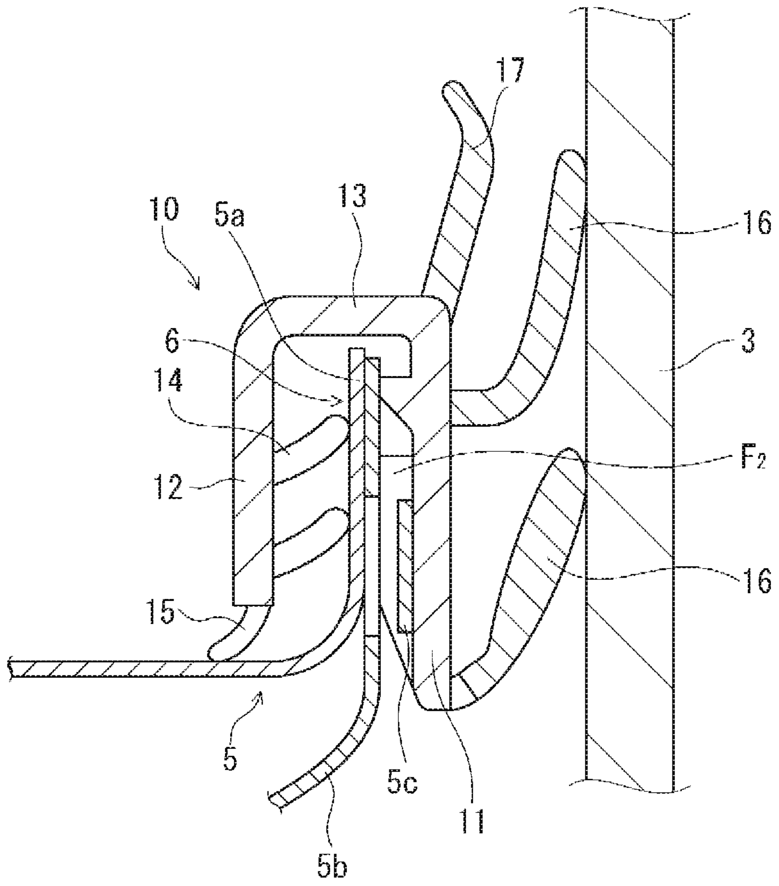
FIG. 8 is a sectional view taken along line VIII-VIII in FIG. 7.

FIGS. 7 and 8 show Embodiment 3 of the present disclosure. In Embodiment 3, the protrusion portion 5*c* protrudes toward the vehicle outside. The protrusion portion 5*c* is formed by cutting and raising a part of the reinforcement 5*b* forming the flange 6. The protrusion portion 5*c* has the contact surface $F_1$ that faces toward the center side in the door front-rear direction, and the surface direction thereof intersects the door front-rear direction. Therefore, in a state where the inner weatherstrip 10 is attached, the positioning surface $F_2$ is formed on the vehicle outside sidewall portion 11 that comes into contact with the reinforcement 5*b*. The positioning surface $F_2$ is recessed toward the vehicle outside by a step formed by partially cutting the inner surface of the vehicle outside sidewall portion 11. The positioning surface $F_2$ intersects the longitudinal direction of the inner weatherstrip 10. In Embodiment 3, it is not necessary to recess a part of the vehicle inside sidewall portion 12 toward the vehicle inside. Therefore, the extrusion molded portion 10*p* and the injection molded portion 10*s* are continuous in a flush state. Since other parts are the same as those of Embodiment 1, the same members will be given the same reference numerals, and the description thereof will be omitted.

Although the representative embodiment of the present disclosure has been described above, the present disclosure is not limited to this, and various modifications are possible without departing from the gist of the present disclosure. For example, the protrusion portion 5*c* may be provided at the center portion or tip end portion of the inner weatherstrip 10 instead of being provided on the rear side of the inner weatherstrip 10. In these cases as well, the contact surface $F_1$ is formed to face the center side in the door front-rear direction, and the positioning surface $F_2$ is formed to face the contact surface $F_1$.

In Embodiment 1, as a method for forming the positioning surface $F_2$ on the vehicle inside sidewall portion 12, the injection molded portion 10*s* and the extrusion molded portion 10*p* are connected in a flush state, and then it is also possible to cut a part of the inner side wall portion 12 to make it thinner, or to drill an inner/outer through-hole. In Embodiment 3, as a method for forming the positioning surface $F_2$ on the vehicle outside sidewall portion 11, an inside/outside through-hole may also be drilled at a part of the vehicle outside sidewall portion 11.

When the inner door panel 5*a* is reinforced by the reinforcement 5*b*, the reinforcement 5*b* forming the flange 6 is also cut and raised together with the inner door panel 5*a*, and the reinforcement 5*b* and the inner door panel 5*a* can also form the contact surface $F_1$. When the reinforcement 5*b* is not located, a part of the inner door panel 5*a* is cut and raised to form the protrusion portion 5*c*.

The size of the positioning surface $F_2$ does not necessarily have to be larger than the contact surface $F_1$. It is not always necessary to form the injection molded portion 10*s*, either.

REFERENCE SIGNS LIST

1 Door
3 Window pane
5 Door panel
5*a* Inner door panel
5*b* Reinforcement
5*c* Protrusion portion
6 Flange
10 Inner weatherstrip
10*p* Extrusion molded portion
10*s* Injection molded portion
11 Vehicle outside sidewall portion
12 Vehicle inside sidewall portion

13 Top wall portion
14 Holding lip
15 Shielding lip
16 Seal lip
17 Decorative lip
$F_1$ Contact surface
$F_2$ Positioning surface

The invention claimed is:

1. A structure for attaching an elongated inner weatherstrip, wherein the inner weatherstrip is attached along an upper edge of a door panel of an automobile door, a flange is formed on the upper edge of the door panel, the inner weatherstrip has a vehicle inside sidewall portion, a vehicle outside sidewall portion, and a top wall portion coupling upper edges of the vehicle inside sidewall portion and the vehicle outside sidewall portion, the flange is inserted between the vehicle inside sidewall portion and the vehicle outside sidewall portion, a protrusion portion protruding toward a vehicle inside is formed at a part of the flange, the protrusion portion has a contact surface facing a center of the flange in a longitudinal direction of the flange, a positioning surface extending in a direction intersecting with a longitudinal direction of the inner weatherstrip is provided at a part of the vehicle inside sidewall portion, the positioning surface is formed by recessing at least a part of the vehicle inside sidewall portion facing the protrusion portion toward the vehicle inside, the contact surface is in contact with the positioning surface, at least one end portion of the inner weatherstrip in the longitudinal direction has an injection molded portion formed by injection molding, the inner weatherstrip includes an extrusion molded portion formed by extrusion molding, in the vehicle inside sidewall portion, the injection molded portion overlaps a vehicle inside outer surface of one end portion of the extrusion molded portion in the longitudinal direction, and one end surface of the extrusion molded portion in the longitudinal direction serves as the positioning surface.

2. The structure for attaching an inner weatherstrip according to claim 1, wherein the protrusion portion is formed by cutting and raising a part of the flange.

3. The structure for attaching an inner weatherstrip according to claim 2, wherein the protrusion portion is formed by cutting and raising a part of the inner door panel that constitutes the flange.

4. An elongated inner weatherstrip, wherein the inner weatherstrip is attached along an upper edge of a door panel of an automobile door, a vehicle inside sidewall portion, a vehicle outside sidewall portion, and a top wall portion coupling upper edges of the vehicle inside sidewall portion and the vehicle outside sidewall portion are provided, a flange formed on the upper edge of the door panel is attached in a state of being inserted between the vehicle inside sidewall portion and the vehicle outside sidewall portion, a protrusion portion protruding toward a vehicle inside and having a contact surface facing toward a center of the flange in a longitudinal direction of the flange is formed at a part of the flange, a positioning surface extending in a direction intersecting with a longitudinal direction of the inner weatherstrip is provided at a part of the vehicle inside sidewall portion, the positioning surface is formed by recessing at least a part of the vehicle inside sidewall portion facing the protrusion portion toward the vehicle inside, the contact surface is in contact with the positioning surface in a state of being attached to the door panel, at least one end portion of the inner weatherstrip in the longitudinal direction has an injection molded portion formed by injection molding, the inner weatherstrip includes an extrusion molded portion formed by extrusion molding, in the vehicle inside sidewall portion, the injection molded portion overlaps a vehicle inside outer surface of one end portion of the extrusion molded portion in the longitudinal direction, and one end surface of the extrusion molded portion in the longitudinal direction serves as the positioning surface.

5. The inner weatherstrip according to claim 4, wherein the positioning surface is larger than the contact surface.

6. An elongated inner weatherstrip, wherein the inner weatherstrip is attached along an upper edge of a door panel of an automobile door, a vehicle inside sidewall portion, a vehicle outside sidewall portion, and a top wall portion coupling upper edges of the vehicle inside sidewall portion and the vehicle outside sidewall portion are provided, a flange formed on the upper edge of the door panel is attached in a state of being inserted between the vehicle inside sidewall portion and the vehicle outside sidewall portion, a protrusion portion protruding toward a vehicle inside and having a contact surface facing toward a center of the flange in a longitudinal direction of the flange is formed at a part of the flange, a positioning surface extending in a direction intersecting with a longitudinal direction of the inner weatherstrip is provided at a part of the vehicle inside sidewall portion, the positioning surface is formed by recessing at least a part of the vehicle inside sidewall portion facing the protrusion portion toward the vehicle inside, the contact surface is in contact with the positioning surface in a state of being attached to the door panel, at least one end portion of the inner weatherstrip in the longitudinal direction has an injection molded portion formed by injection molding, the inner weatherstrip includes an extrusion molded portion formed by extrusion molding, in the vehicle inside sidewall portion, the injection molded portion overlaps a vehicle inside outer surface of one end portion of the extrusion molded portion in the longitudinal direction, a projected piece protrudes from the injection molded portion toward the vehicle outside to cover one end surface of the extrusion molded portion in the longitudinal direction, and one end surface of the projected piece in the longitudinal direction serves as the positioning surface.

7. A structure for attaching an elongated inner weatherstrip, wherein the inner weatherstrip is attached along an upper edge of a door panel of an automobile door, a flange is formed on the upper edge of the door panel, the inner weatherstrip has a vehicle inside sidewall portion, a vehicle outside sidewall portion, and a top wall portion coupling upper edges of the vehicle inside sidewall portion and the vehicle outside sidewall portion, the flange is inserted between the vehicle inside sidewall portion and the vehicle outside sidewall portion, a protrusion portion protruding toward a vehicle inside is formed at a part of the flange, the protrusion portion has a contact surface facing a center of the flange in a longitudinal direction of the flange, a positioning surface extending in a direction intersecting with a longitudinal direction of the inner weatherstrip is provided at a part of the vehicle inside sidewall portion, the positioning surface is formed by recessing at least a part of the vehicle inside sidewall portion facing the protrusion portion toward the vehicle inside, the contact surface is in contact with the positioning surface, at least one end portion of the inner weatherstrip in the longitudinal direction has an injection molded portion formed by injection molding, the inner weatherstrip includes an extrusion molded portion formed by extrusion molding, in the vehicle inside sidewall portion, the injection molded portion overlaps a vehicle inside outer surface of one end portion of the extrusion molded portion in the longitudinal direction, a projected piece protrudes from the injection molded portion toward the vehicle outside to cover one end surface of the extrusion molded portion in the longitudinal direction, and one end surface of the projected piece in the longitudinal direction serves as the positioning surface.

* * * * *